F. A. PERSOHN.
SPECTACLE FRAME.
APPLICATION FILED APR. 18, 1913.
1,083,702.
Patented Jan. 6, 1914.
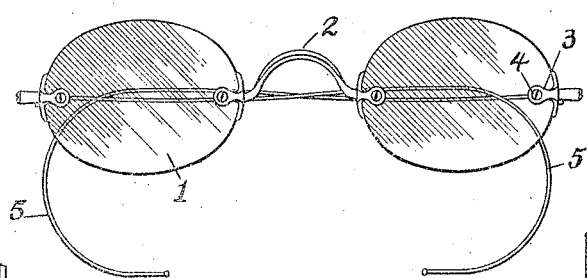
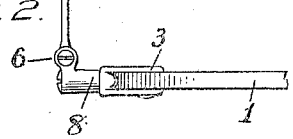
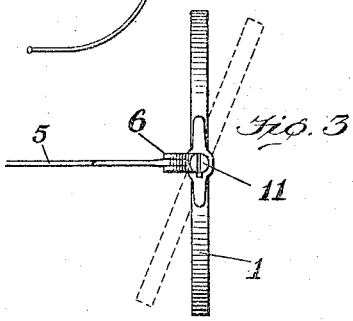
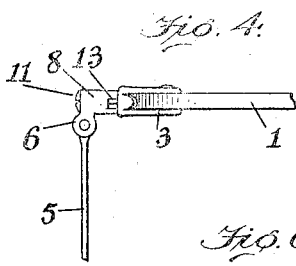
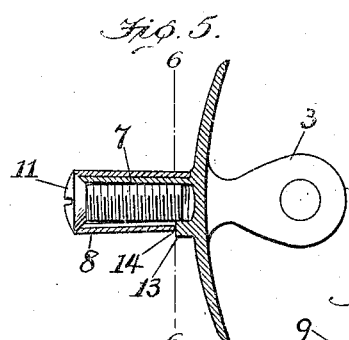
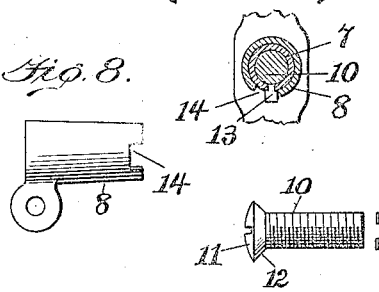
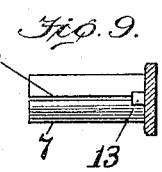
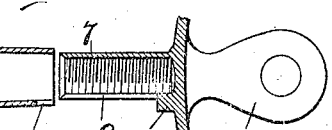
WITNESSES:
Edwin L. Bradford
G. Ferd. Vogt.
INVENTOR
Frank A. Persohn
BY Mann & Co
Attorneys

UNITED STATES PATENT OFFICE.

FRANK A. PERSOHN, OF BALTIMORE, MARYLAND.

SPECTACLE-FRAME.

1,083,702.   Specification of Letters Patent.   Patented Jan. 6, 1914.

Application filed April 18, 1913. Serial No. 761,937.

*To all whom it may concern:*

Be it known that I, FRANK A. PERSOHN, a citizen of the United States, residing at Baltimore, in the State of Maryland, have invented certain new and useful Improvements in Spectacle-Frames, of which the following is a specification.

This invention relates to improvements in the construction of spectacle frames.

The improvements have special reference to spectacle frames for holding lenses that are capable of axial or tilting movement relative to the temples that sustain the spectacles in position before the eyes of the wearer.

The invention is illustrated in the accompanying drawing, in which,

Figure 1 shows a pair of spectacles in which the lenses are of the rimless type. This is a front view—the temples being folded. Fig. 2 is a top or plan view of one lens and shows the joint that connects one temple. Fig. 3 is a side elevation of the same parts shown in Fig. 2. Fig. 4 is an inverted or bottom plan of the same parts shown in Fig. 2. Fig. 5 is a section view on a larger scale and shows the construction of the improved tension device adjacent the temple-joint which latter is not seen in this figure. Fig. 6 is a cross-section on the line 6—6 of Fig. 5, and shows the stop-device that limits the tilting of the lens. Fig. 7 shows the several parts of the tension device separated from each other for the purpose of clear illustration. Fig. 8 is a side view of the sleeve and shows the stop notch. Fig. 9 is a view of the tubular spindle and shows the slit.

The invention is applicable to spectacles that have rims for the lenses or to lenses of the "rimless" type; in the present instance the lenses shown are "rimless." It may also be stated that either single lenses or bifocal lenses may be employed with the improved spectacle frames.

The numeral, 1, designates the lenses; 2, a bridge of any suitable kind connecting the two lenses; 3, a lens clip at the outer end of each lens, and, 4, a screw confining each clip to the lens. Each temple, 5, is connected with the lens-frame by a joint, 6, of a familiar kind; one part of this joint is attached to the temple and the other part to a sleeve, 8. The improved parts that comprise the present invention, are interposed between the clip, 3, that attaches to the lens and the joint, 6, that connects with the temple. These improved parts consist of a tubular spindle, 7, attached to the lens-clip, 3, and a sleeve, 8, attached to one part of the temple-joint, 6. The tubular spindle, 7, has a slit, 9, extending from its open end longitudinally; this slit, in the thin metal of which this device will be made, permits the tubular structure in its cross-section to have a certain degree of expansion and contraction for the purpose of tension to be presently explained. The sleeve, 8, is slightly tapered the larger end being that to which one part of the temple-joint, 6, is attached. This sleeve, 8, has position around the tubular spindle, 7, the smaller end of the sleeve is nearest the lens-clip, and the spindle is loose or free to partly turn in the sleeve and permit the lens to tilt. As already stated the temple, 5, is jointed at, 6, to the sleeve, 8, and as both temples and both ends of the spectacles are alike, it follows that when the spectacles have been placed in position, the two lenses may be tilted on an axial line through their longitudinal centers, from a vertical position to an inclined position, which latter position is shown in Fig. 3 by broken lines; this inclined position of the lenses facilitates the eye to see near work, or to read from a book.

In order to prevent the lenses from tilting too freely an improved tension device is provided, and is shown in Figs. 5, 7 and 9, of the drawing. The tension device consists of the slit, 9, in the tubular spindle, 7; the sleeve fitting freely around said spindle, and a screw, 10, having a head, 11, which is provided on its under side with a bevel, 12. When the threaded part of the screw is inserted into the internally-screw-threaded split tube, 7, the beveled under side, 12, of the screw-head will act on the open end of said split tube and thereby expand the tube within the said sleeve, 8, and increase the friction thereof; this increased friction is the tension referred to.

An improved stop device is provided to limit the extent to which the lenses may tilt on their longitudinal axis. This consists of a lug, 13, projecting radially at the base of the tubular spindle, 7, and a notch, 14, at the smaller end of the sleeve, 8, which notch straddles said lug, 13. The relation of the parts of this stop device will be understood by an inspection of Figs. 5 to 9. This device permits a limited tilting of the lens, and prevents it from completely turning.

Having thus described my invention what I claim and desire to secure by Letters Patent is:—

1. Spectacle frames having in combination a temple; a tapered sleeve attached to the temple by a joint; a lens supported at one end by a nose-bridge and at the other end by a tubular spindle said tube having a slit extending longitudinally from its open end and the tubular spindle fitting within said sleeve—the smaller end of the sleeve being nearest the lens; and means inserted into said slitted tubular spindle to expand it within the sleeve.

2. Spectacle frames having in combination a temple; a sleeve jointed to the temple and having a notch; a lens supported at its outer end by a tubular spindle fitting within said sleeve and capable of partly turning therein said spindle being provided with a radially-projecting lug that engages said notch on the sleeve and serving as a stop to limit the turning of the spindle, and means inserted into the tubular spindle to confine the sleeve thereon.

3 Spectacle frames having in combination a temple; a sleeve jointed to the temple; a lens supported at its outer end by a tubular spindle internally screw-threaded and the spindle fitting within said sleeve loose or free to permit partly turning in order to tilt the lens; and a screw inserted into the said tubular spindle and confining the sleeve thereon.

In testimony whereof I affix my signature in presence of two witnesses.

FRANK A. PERSOHN.

Witnesses:
    CHAS. B. MANN,
    G. FRED. VOGT.